United States Patent
Hoang et al.

(10) Patent No.: US 8,488,133 B2
(45) Date of Patent: Jul. 16, 2013

(54) SYSTEM AND METHOD FOR MARKING PRINT MEDIA

(75) Inventors: Cuong Manh Hoang, Lexington, KY (US); David John Mickan, Lexington, KY (US); Mark Stephen Underwood, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1540 days.

(21) Appl. No.: 11/468,313

(22) Filed: Aug. 30, 2006

(65) Prior Publication Data

US 2008/0055610 A1    Mar. 6, 2008

(51) Int. Cl.
*G06F 3/12* (2006.01)

(52) U.S. Cl.
USPC ....... 358/1.1; 358/1.2; 340/572.1; 340/568.1; 340/540; 340/500

(58) Field of Classification Search
USPC .............. 358/1.1, 1.2; 340/572.1, 568.1, 540, 340/500
See application file for complete search history.

(56) References Cited

U.S. PATENT DOCUMENTS

| | | | |
|---|---|---|---|
| 4,905,168 A * | 2/1990 | McCarthy et al. | 345/474 |
| 5,870,535 A * | 2/1999 | Duffin et al. | 358/1.16 |
| 6,069,955 A * | 5/2000 | Coppersmith et al. | 380/54 |
| 6,593,853 B1 | 7/2003 | Barrett et al. | |
| 2002/0131084 A1 * | 9/2002 | Andrew et al. | 358/1.16 |
| 2003/0061947 A1 * | 4/2003 | Hohberger et al. | 101/2 |
| 2004/0128612 A1 * | 7/2004 | Dietl | 715/500 |
| 2005/0029350 A1 * | 2/2005 | Jusas et al. | 235/451 |
| 2005/0230478 A1 * | 10/2005 | Chapman et al. | 235/462.13 |

* cited by examiner

*Primary Examiner* — Benny Q Tieu
*Assistant Examiner* — Martin Mushambo

(57) ABSTRACT

Systems and methods for marking media are provided. The method may include preparing an image for printing on print media, the image including an indication of a first and a second event. The method may further include printing a first portion of the image on the print media, evaluating data and electing to print a second portion of the image wherein the second portion includes the indication of either of the first or second event.

35 Claims, 8 Drawing Sheets

SYSTEM AND METHOD FOR MARKING PRINT MEDIA

TECHNICAL FIELD

The present disclosure relates to printers and printing systems. More particularly, the disclosure relates to a system and method for preparing an image for printing on print media that may be printed in one of two configurations depending upon separately evaluated information.

BACKGROUND OF THE INVENTION

Inkjet and laser printers have become commonplace equipment in most workplace and home computing environments. Today, many printers are multi-functional assemblies capable of printing on a large array of print media including letterhead, paper envelopes and labels A recent innovation in the printing industry involves the manufacturing of print media with embedded radio frequency signatures in the form of Radio Frequency identification (RFID) transponders or tags. These tags, sometimes called "Smart Labels", may be used with a variety of existing printing methods.

Embedded print media generally comprises a backing material (sometimes referred to as the "web") upon which a label is applied, with a RFID tag sandwiched in between the label and the backing material. There may be one or more labels on the web and the sheet, as presented, may be part label and part plain paper. In some cases, there may be more than one tag arrayed across the width and down the length of the media such that multiple columns and/or rows of tags are contained on the print media.

Another similar type of embedded print media is known as "Smart Paper" in which RFID tags are embedded into the media without labels. One application for Smart Paper is in the area of secure document storage where access to information printed on a document is controlled by use of data control mechanisms such as an Access Control List ("ACL") embedded in a tag on the media. To control access, a radio frequency reader/programmer situated near a control point, such as an access control cabinet, can check the ID of a user wanting to access the cabinet against the ACL on the tag on the media. If the ID of the user and the ACL do not match, an alarm can be invoked to notify of an attempted breach in security. In addition, the information on the ACL can be spread among a plurality of tags on a single sheet of print media to accommodate multiple accesses by multiple users and to save costs in the printed media.

Printing labels on a cut-sheet printer such as a laser or inkjet printer provides a relatively wide format that allows multiple columns of labels to be used. The use of multiple columns improves the overall rate at which the labels can be printed. At the same time, because the customer can print more than one label for each sheet printed, the relative cost of each label is greatly reduced.

Accordingly, printing on media with embedded RFID tags is rapidly becoming a growing area of label printing. Each tag on a sheet can be printed with certain data, and the RFID tag within that media can be used to allow individualized processing of user associated data. For example, a shipping label might have the delivery address and a package tracking ID printed on it, while the corresponding tag would be programmed with the same information. The delivery information can then be read from the tag, whether or not the package is positioned so that the tag is visible.

Printing label media with RFID tags presents the additional problem of how to manage media with tags that have been damaged or are otherwise inoperable. While it is relatively straightforward to visually examine a printed page and detect gross defects with the printed output, a "bad" tag may be difficult or impossible to distinguish from a "good" tag without attempting to electronically read and verify the tag's operation and content.

Laser printers have a characteristic that may also make the detection and separation of media having defective tags a problem. With laser printers the page typically can not be stopped or reversed during the printing operation without jeopardizing the quality of the printed image on the page. This may make it difficult to distinguish bad tags from good ones without stopping the printing process. Moreover, changing the existing communications protocol between engine and software, or providing additional signals to the options may require substantial modifications in either hardware or software.

SUMMARY

In accordance with one exemplary embodiment, the present disclosure describes a method of marking print media. The method includes preparing an image for printing on print media the image including an indication of a first and a second event. The method may further include printing a first portion of the image on the print media and evaluating data and electing to print a second portion of the image wherein the second portion includes the indication of either of the first or second event.

In accordance with another exemplary embodiment, the present disclosure describes a computer-readable storage medium having stored thereon instructions that when executed by a machine result in the following instructions may include preparing an image for printing on print media, the image including an indication of a first and a second event. Instructions may further include printing a first portion of the image on the print media and evaluating data and electing to print a second portion of the image wherein the second portion includes the indication of either of the first or second event.

According to yet another exemplary embodiment, a system for marking media during a printing process is provided. The system includes at least one processor configured to prepare an image for printing on print media, the image including an indication of a first and a second event. The system further includes a printing device configured to print a first portion of the image on the media and a radio frequency controller having control logic for performing a set of radio frequency control functions. The controller may be configured to evaluate data associated with an object on or within the print media. The printing device may be configured to elect to print a second portion of the image wherein the second portion includes the indication of either of the first or second event.

BRIEF DESCRIPTIONS OF THE DRAWINGS

The present disclosure is illustrated by way of example and is not limited by the figures in the accompanying drawings in which like references indicate similar elements, and in which.

DETAILED DESCRIPTION

For simplicity the discussion below will use the terms "media", "sheet" and/or "paper" to refer to a discrete unit of recording media. It should be understood, however, that this term is not limited to paper sheets, and any form of discrete recording media is intended to be encompassed therein, including without limitation, envelopes, transparencies, postcards, labels, and the like. The disclosure herein may also apply to printing devices such as an electrophotographic printer, an inkjet printer, a fax device, a copier, an all-in-one device or a multipurpose device.

Figure 1:
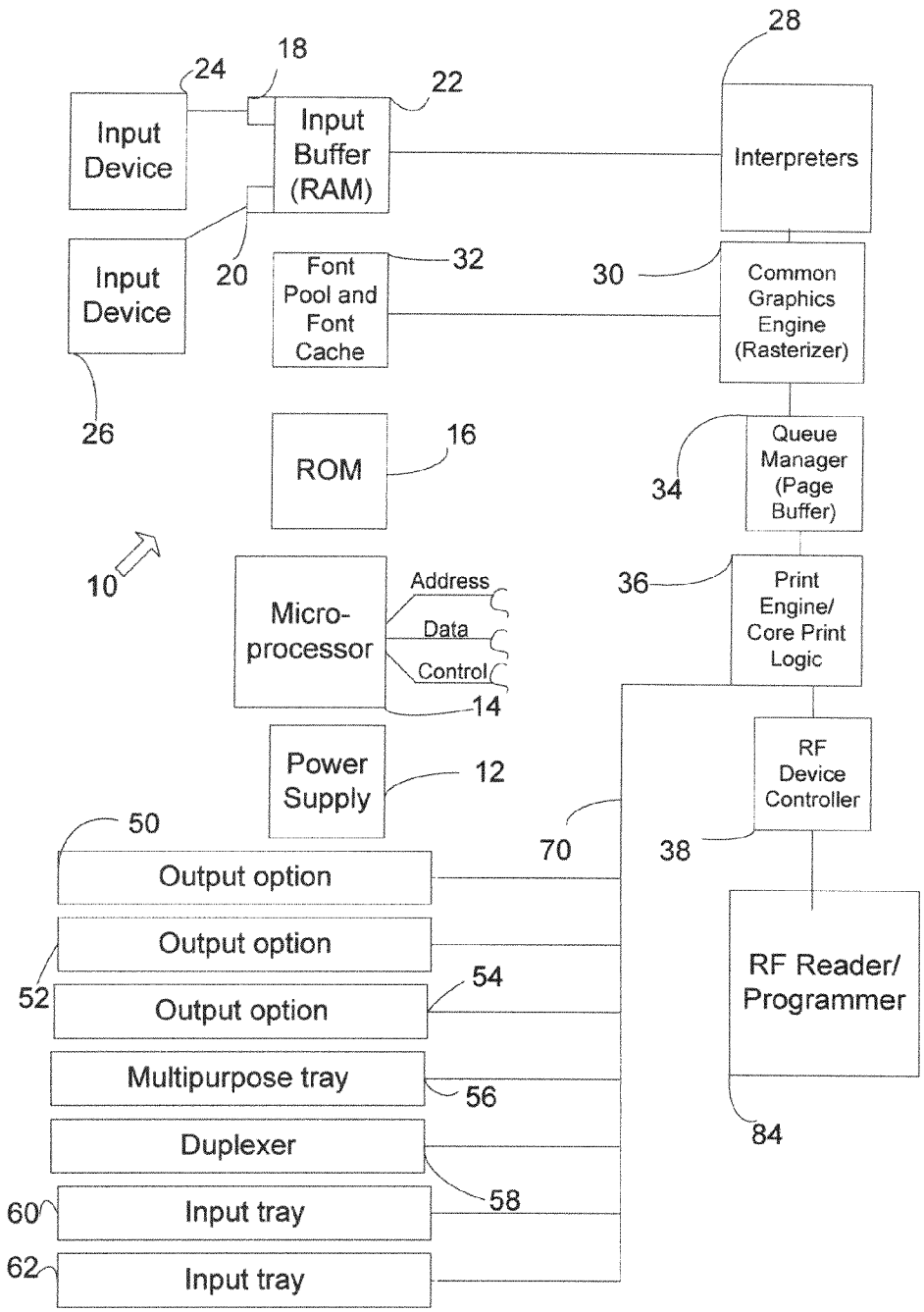
FIG. 1 is a block diagram of a printing system in accordance with the present disclosure.

Referring now to the drawings, FIG. 1 shows a hardware block diagram of a printing system, generally designated by the reference numeral 10, which may be adapted to identify and mark media having one or more defective radio frequency data storage devices during a printing process. While the present disclosure is therefore disclosed in connection with radio frequency data storage devices, it can be appreciated that it is not so limited. The printing system 10 may contain certain components, such as a DC power supply 12 that may have multiple outputs of different voltage levels, a microprocessor 14 having address lines, data lines, and control and/or interrupt lines, Read Only Memory (ROM) 16, and Random Access Memory (RAM), which may be divided by software operations into several portions for performing several different functions.

System 10 may be used to identify and mark cut-sheet media embedded with radio frequency device tags such as, for example, a Radio Frequency Identification (RFID) tag. In this way, the printing system 10 may identify and mark media with defective or "bad" tags during the printing process without otherwise disturbing the normal operation of the printer.

Printing system 10 may also contain at least one serial input or parallel input port, network or USB port, or in many cases both types of input ports, as designated by the reference numeral 18 for the serial port and the reference numeral 20 for the parallel port. Each of these ports 18 and 20 may be connected to a corresponding input buffer, generally designated by the reference numeral 22 on FIG. 1. Serial port 18 could be connected to a serial output port of a personal computer or a workstation that may contain a software program such as a word processor or a graphics package or computer aided drawing package. Similarly, parallel port 20 could be connected to a parallel output port of the same type of personal computer or workstation containing the same types of programs. Such input devices are designated, respectively, by the reference numerals 24 and 26 on FIG. 1.

Once the text or graphical data has been received by input buffer 22, it may be communicated to one or more interpreters designated by the reference numeral 28. A common interpreter is PostScript™, which is one industry standard used by laser printers. After being interpreted, the input data may be sent to a common graphics engine to be rasterized, which may occur in a portion of RAM designated by the reference numeral 30 on FIG. 1. To speed up the process of rasterization, a font pool and possibly also a font cache may be stored, respectively, in ROM or RAM within most laser printers, and these font memories are designated by the reference numeral 32 on FIG. 1. Such font pools and caches may supply bitmap patterns for common alphanumeric characters so that the common graphics engine 30 may easily translate each such character into a bitmap using a minimal elapsed time.

Once the data has been rasterized, it may be directed into a Queue Manager or page buffer, which is a portion of RAM designated by the reference numeral 34. In a typical laser printer, an entire page of rasterized data may be stored in the Queue Manager during the time interval that it takes to physically print the hard copy for that page. The data within the Queue Manager 34 may be communicated in real time to a print engine designated by the reference numeral 36. Print engine 36 includes a laser light source within its printhead (not shown), and its output is the physical marking onto a piece of paper, which is the final print output from printing system 10.

It will be understood that the address, data, and control lines may be typically grouped in buses, which are electrically conductive pathways that are physically communicated in parallel (sometimes also multiplexed) around the various electronic components within printing system 10. For example, the address and data buses are typically sent to all ROM and RAM integrated circuits and the control lines or interrupt lines are typically directed to all input or output integrated circuits that act as buffers.

Print engine 36 may contain the core print logic which may be embodied in an Application Specific Integrated Circuit (ASIC) (not shown), for example, and which acts as the printing device's primary controller and data manipulating device for the various hardware components within the print engine 36. The bitmap print data arriving from Queue Manager 34 may be received by the core print logic, and at the proper moments may be sent in a serialized format to the laser printhead.

The print engine 36 may be in communication with a number of paper-handling devices via a communications bus 70. Some of the paper-handling devices depicted on FIG. 1 could include output options 50, 52, and 54, a multipurpose tray 56, a duplexer 58, and input trays 60 and 62. The output options may vary depending on the particular finish functionality provided by the printing system 10. Examples of output options may include, but are not limited to, a single output bin, a 5-bin multi-bin stacker and/or a single bin stapler finishing option.

Printing system 10 also may include at least one paper (or other type of print media) positioning sensor. In some cases, the paper positioning sensors may be optoelectronic devices, which have a light source that typically is a light emitting diode (LED). This provides a means for sensing the position of a sheet of paper or other print media and provides a way of determining when the leading edge or trailing edge of a sheet of print media has reached a particular point along the media pathway.

Other types of sensors are envisioned, such as a limit switch to detect whether or not the printer cover is closed. Furthermore, it will be understood that many different types of paper positioning sensors can be used other than optoelectronic devices.

Printing system 10 may include RF device controller 38 operatively connected to communications bus 70 and print engine 36. Controller 38 may include control logic for performing a set of radio frequency control functions and may be configured to determine if a defective RFID tag is present on the cut sheet of print media (see FIG. 2). Again, while the present disclosure is described with respect to determining if a defective RFID tag is present on the print media, it can be appreciated that controller 38 may be understood as capable of evaluating various forms of data associated with other objects on or within the print media.

Common graphics engine 30 may be configured to prepare an image (rasterize) for printing on the sheet of print media. The image may include information indicating a first and second event, e.g., a failure event and/or a success event. A failure image may be printed on the cut sheet of print media if controller 38 determines that a defective RFID tag is present. The failure image may be printed after a first portion of the image has been printed or it may be superimposed upon the image. As expected, system 10 may be configured to follow the success branch and print the image if a successful (i.e. non-defective) RFID tag is present. In certain embodiments, the success image may correspond to a second portion of the image, which may be the remaining portion of the original image. It is envisioned that controller 38 may include RFID control logic and may be configured to program RFID tags as well. Non-RFID pages will not trigger a response from the RFID logic, and will be sent to the user-specified bin via the normal procedures.

Figure 2:
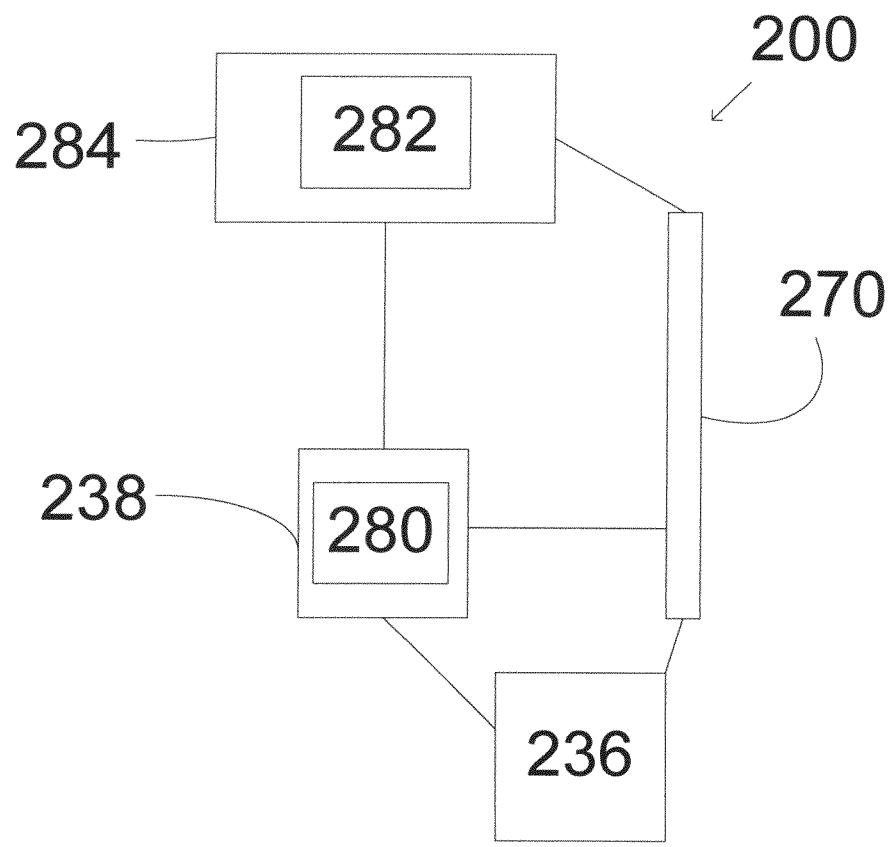
FIG. 2 shows a block diagram of a controller in accordance with the present disclosure.

FIG. 2 illustrates another exemplary embodiment 200 showing a possible configuration between controller 238 having RF control logic 280. The RF antenna 282 may be used by a radio frequency reader/programmer 284 to read and/or program an object, such as, for example, a radio frequency device tag in order to confirm whether a tag is working or defective. At the programming antenna location 284, the radio frequency control logic 280 may attempt to read and/or program a tag embedded in the media and then note the success or failure of this attempt. The radio frequency control logic 280 may then monitor or "listen" on its communications port to track the page's location as it moves through the printer.

It is envisioned that controller 38 may be packaged into an aftermarket option that may be installed in a printer, such as printing device 10, without modification of the printer's other essential systems such as print engine 36 including the core print logic.

Figure 3:
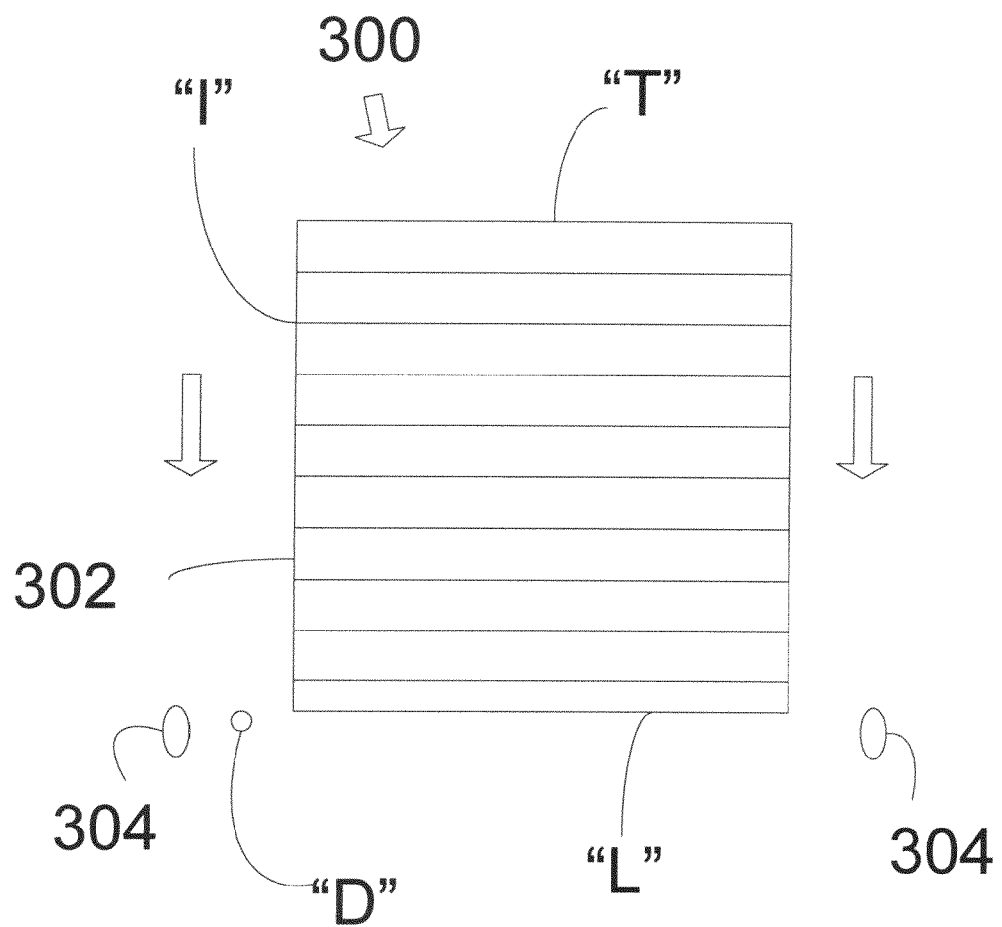
FIG. 3 shows an example of an RFID sheet in accordance with an embodiment of the present disclosure.

FIG. 3 shows an example of print media 300 in accordance with an exemplary embodiment of the present disclosure. In some embodiments print media 300 may correspond to an RFID sheet of print media. Here, a raw bitmap image may be broken into bands 302 that are linked together in a linked list. Each band 302 may contain a certain predetermined number of scan lines of image data. Print media 300 may contain bands 302 and may also include leading edge "L" and trailing edge "T". The decision point "D" depicts the point at which the success or failure of the RFID tag is known. A first portion of a prepared image may be printed prior to reaching decision point "D". Decision point "D" may correspond with the instant the leading edge "L" of the print media 300 reaches exit sensor 304. Image point "I" refers to the point in the paper path corresponding to the current scan line being imaged by the video subsystem.

Exit sensor 304 may be configured to determine the position of print media 300 and may be constructed of optical components similar to those described above Exit sensor 304 may be positioned in a variety of different configurations including before or after image point "I" as shown in FIG. 3. The programming status of, for example, an object such as an RFID tag (success/failure) may then be known to the printer firmware before the last link in the band list is traversed. For example, the distance between image point "I" and exit sensor 304 could be approximately 215 mm (~8.5 inches). In this example, if print media 300 is longer than 215 mm (~8.5 inches) the printer firmware will know if the RFID programming has been a success or a failure prior to the instant trailing edge "T" leaves image point "I". This may provide adequate space and allows time for system 10 to print a failure message.

Figure 4:
FIG. 4 shows a typical band link sequence in accordance with an embodiment of the present disclosure.

A band link sequence is depicted in FIG. 4. A band link sequence may be used to break a raw bitmap image into bands that may be linked together in a linked list. Each band may contain a certain predetermined number of scan lines of image data (e.g. 128). This may correspond to roughly 0.2 inches of media length at a 600×600 dpi resolution. As the image is printed and the image data is consumed by the print engine, the list of bands is traversed in the sequence indicated by their successive links.

Figure 5:
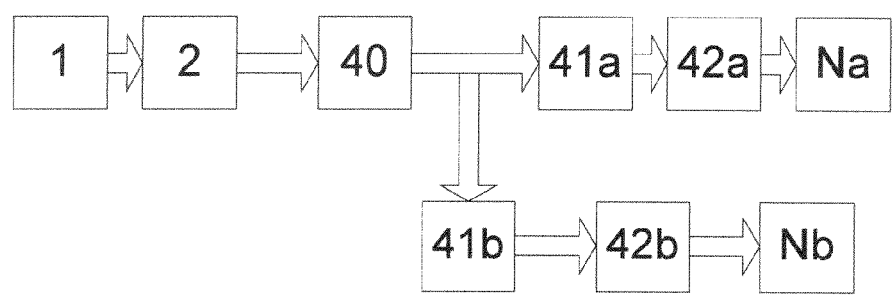
FIG. 5 shows a branch point in accordance with an embodiment of the present disclosure.

A point in the list of image "bands" that corresponds to a point at or beyond the decision point "ID" defined above is identified as the branch point "B" and is shown in FIG. 5. In the example above, this point may occur between the 40th and 41st bands, or approximately 8.53 inches down the page. At this point, on a normally desired page, there may be a link between the data structure containing band 40 and the data structure containing band 41. It is envisioned that the data structure for band 40 may include two links: one to band 41a and one to band 41b (FIG. 5). Thus, the image may "branch" into two separate, equally possible interpretations of the second portion of the image beyond band 40 or the 8.53 inch mark. In the example, the "41a" branch may represent the intended "success" or "default" image for the remainder of the page (e.g. the first event), while the "41b" branch may represent the image to be printed on a tag program failure (e.g. the second event).

By the time print media 300 reaches decision point "d", the success or failure of the programming sequence may be known. At the end of band 40, the result of decision point "d" may be used to determine whether to follow the link to band 41a or to band 41b. If the tag program is successful, the "41a" branch may be followed, and the resulting image is the originally intended image. If the tag program fails, the "41b" branch may be followed, and the "failure" image is printed. For example, this image might be the original image with a large "X" superimposed or any other identifier.

Figure 6:
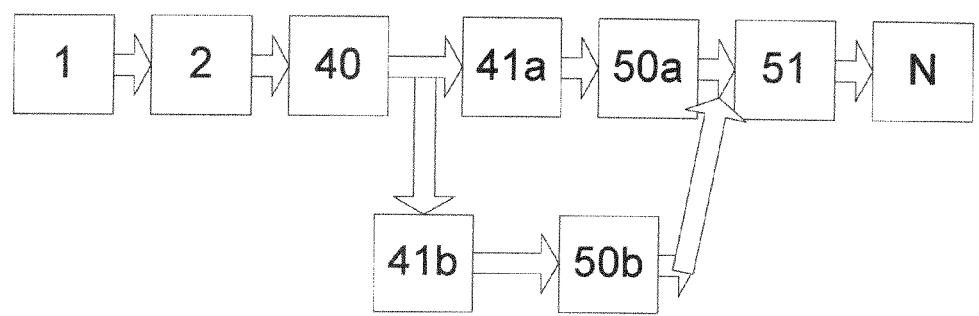
FIG. 6 shows a remerging branch in accordance with an embodiment of the present disclosure.

In some embodiments of the present disclosure the two branched paths can merge back together to conserve resources. This may occur if the portion of the image to be changed in event of failure is shorter than the total remaining length of the image. FIG. 6 shows an example of this for a branched portion that is 10 bands long. Using this technique saves memory for the common blocks at the tail of the image. This requires no special links—simply pointing both blocks 50a and 50b to block 51.

Figure 7:
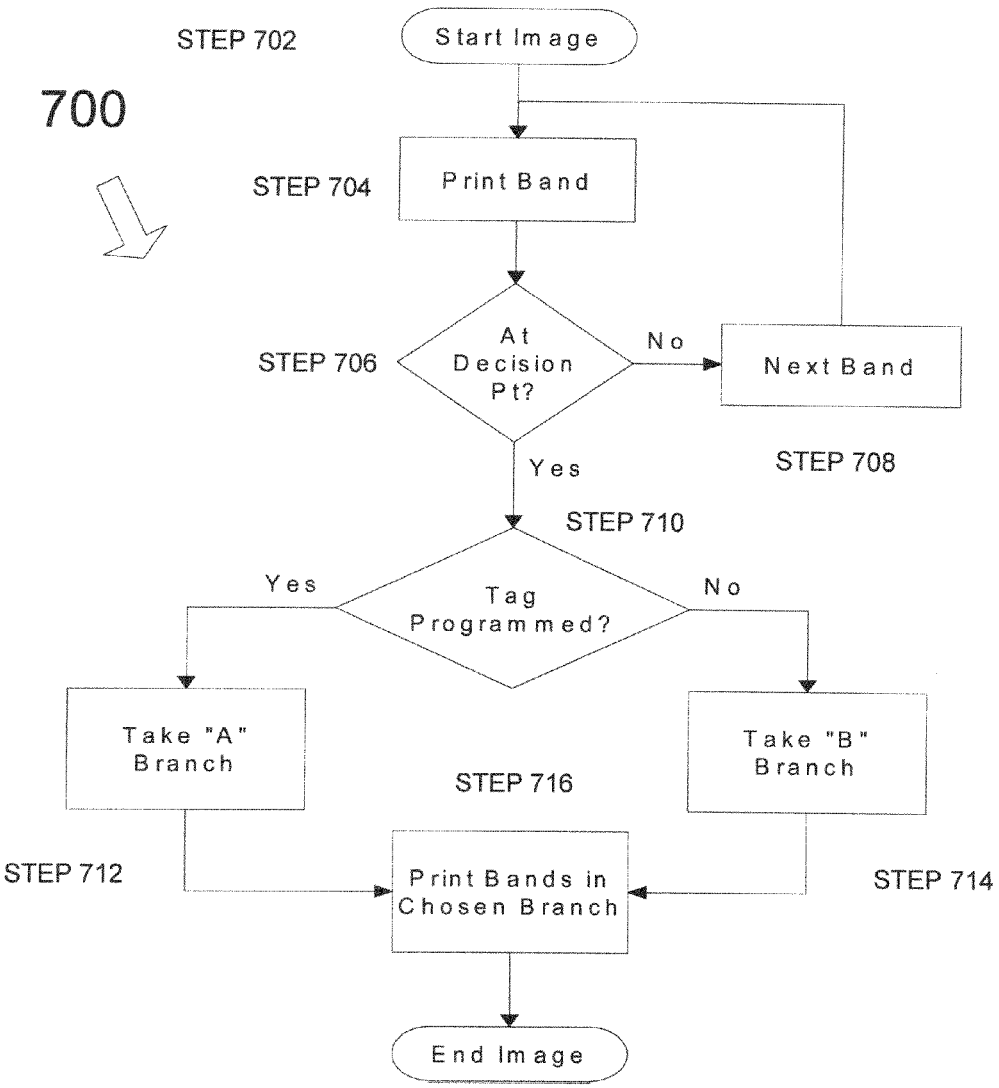
FIG. 7 is a process flow diagram for a method of detecting and marking media having a defective radio frequency device tag.

FIG. 7 is an exemplary flow diagram for a method, denoted generally as 700, of identifying and marking media having an object such as a defective radio frequency device, such as an RFID tag. An image may be prepared for printing (702). A first band may be printed (704). The method may determine if the decision point has been reached, identifying if the RFID tag was successfully programmed (706). If not, the next band in the image may be printed (708). This may continue until the decision point is reached. Once the decision point has been reached, method 700 determines if the RFID tag has been successfully programmed (710). If the RFID tag was successfully programmed the success branch is followed (712). If the RFID tag was not successfully programmed the failure branch may be followed (714). The corresponding branches are then printed (716). Again, while illustrated in connection with an RFID tag, it is again contemplated herein that other objects may be similarly evaluated when associated with print media.

Figure 8:
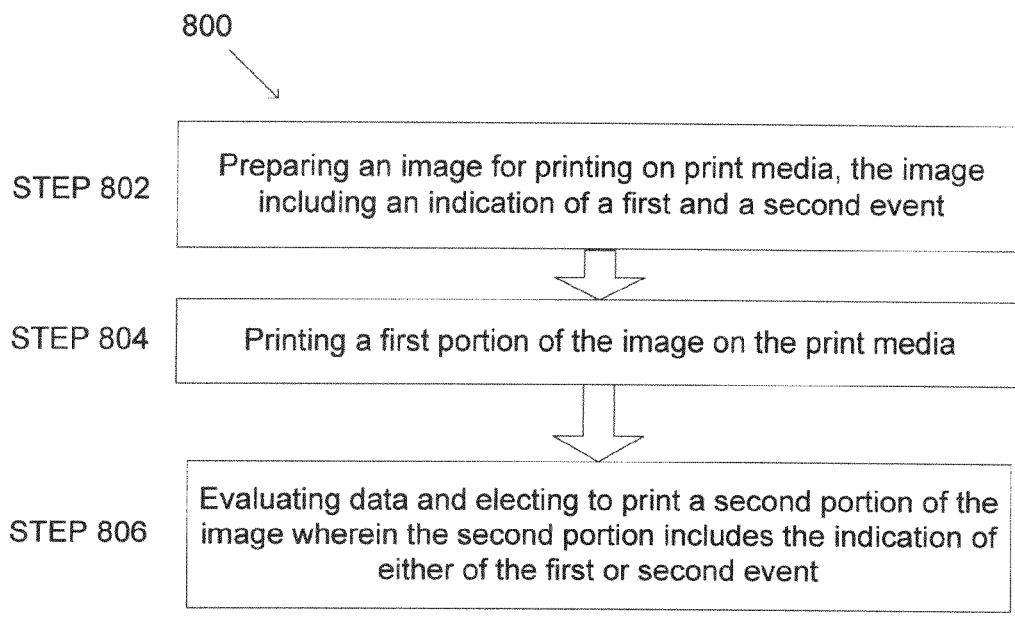
FIG. 8 shows the steps of a method in accordance with an embodiment of the present disclosure.

Referring now to FIG. 8, another exemplary method 800 is shown. An image may be prepared for printing using, for example, a raster image processor (802). The image may include information indicating a first and a second event (in some embodiments the first event and second event may correspond to the failure branch and the success branch described herein). Both the failure branch and the success branch (see FIGS. 3-6), may be prepared before the media reaches the image point. Once the image has been processed, it may be stored within a printing device. A first portion of the image may be printed on the sheet of print media (804). The method may further include evaluating data and electing to print a second portion of the image wherein the second portion includes the indication of either of the first or second event (806). In some embodiments, RFID logic may determine if a defective RFID tag is present on a cut sheet of print media. If so, a failure image corresponding to the failure branch (e.g., the first event) may be printed on the cut sheet of print media. It is envisioned that the failure image could take on a variety of different forms (e.g., an X through the image, the text "TAG failed", or a black line).

The systems and methods described herein may require that the entire image be prepared for printing ("Ripped") before the page reaches the print subsystem. This may be generally true due to the relatively large processing time required to render the image and the speed with which the image must be delivered to the printing subsystem as the media passes through the print station. Thus, both possible branches of the image may be prepared before the media reaches the "image point." There are a number of methods in which this can be accomplished, some of which are described below.

In one embodiment of the present disclosure, the "failure" branch may be pre-defined and stored within the printer. In this case, the RIP logic need only insert the dual branch described at the end of band 40, and point the "b" link to the set of bands describing this pre-defined image as stored in the printer (see FIG. 5). This allows the user to use existing, unmodified page images, and allows the printer to calculate where to insert the dual link. A typical page description for this method might resemble the following pseudo-language:

```
    i. <common section>
   ii. *** Description of image ***
  iii. </common section>
   iv. The alternate image stored in the printer might look like this:
    v. <alt tail>
   vi. *** Description of page "tail" for "failure" case ***
  vii. </alt tail>
```

However, it could also be pre-processed directly into bands of raw bitmap data to save processing time at the expense of printer memory. Moreover, the user might also be permitted to send the alternate image as a separate PCL (or other source language) datastream sent ahead of the primary data stream.

In another exemplary embodiment, the user may provide the alternate image within the print page data itself. This may require adding a set of constructs to the page description language (PCL/PostScript/etc.) or at least a different usage of the existing constructs (e.g., execute this option in PostScript without changing or adding to the language itself). In this embodiment, the user may break the page description into something resembling the following pseudo-language:

```
    i. <common section>
   ii. *** Description of first 8.53" of image ***
  iii. </common section>
   iv. <default tail>
    v. *** Description of page "tail" for "success" case ***
   vi. </default tail>
  vii. <alt tail>
 viii. *** Description of page "tail" for "failure" case ***
   ix. </alt tail>
```

The language parser would then recognize each of these sections and RIP them independently. The three sets of bands would then be linked together, with the "common section" comprising the first 40 bands (in our example printer), the "default tail" section comprising the "41a" branch, and the "alt tail" section comprising the "41b" branch. If, as in FIG. 6, the branches are to re-merge, there may be a second "common section" following the "tail" sections. Once this is complete, the printer can process the bands as described above. Alternatively, the "alt tail" section might describe a watermark or similar object that is overlaid upon the "default tail" image to form the alternate band path instead of rendered completely independently. This method requires that the user know exactly where the "decision point" is so that the common section and tail sections can be properly aligned.

In accordance with yet another exemplary embodiment of the present disclosure the user may define the entire image, and then define an "alternate" image that will either replace the image or be superimposed as a "watermark" or "overlay" image by graphics engine 30. This method may allow the user to be more isolated from the printer implementation details. The user need not specify the location of the "decision point" in the high level description. The RIP firmware, knowing where on the page the "decision point" is, can insert the double link at the correct location. The RIP firmware can then either use the alternate image as-is, or merge the alternate image with the original image to generate the bands for the "41b" path. The high level language description may be of the following form:

```
<common section>
             i.  *** Description of entire image ***
</common section>
<alt tail>
            ii.  *** Description of overlay or alternate image
                 for "failure" case ***
</alt tail>
```

In this exemplary embodiment, the user does not specify where on the page the overlay will be placed. The RIP firmware calculates that location based upon the printer engine operating parameters (i.e. the location of the "decision point" on the page), and constructs the branched band list based on this information. If the "overlay" or "watermark" effect is desired, graphics engine 30 will take the desired image information from bands 41 and following, and generate an alternate image path (for bands 41b and following) by merging a copy of this information with the alternate tail information. If the tag programming is successful, the image will be printed without the "watermark" or alternate image section, and if programming fails, the "watermark" or alternate image will appear.

In yet another exemplary embodiment the alternate image may be a very simple text string or bitmap (e.g., solid black, or a striped or checkerboard pattern) to be attached to the very bottom of the page. In this method, the source image can be specified as mentioned hereinbefore, and the alternate pattern or text string may be stored within the printer. The primary image is "Ripped" via graphics engine 30 and printed as usual. At the "decision point," in the success case, nothing happens. In the failure case, the alternate pattern is "Ripped" on the fly and appended to the end of the user image or overwritten over the last few bands of the user image. For this to work, there must be room at the end of the page for the added failure message (in the append case), and the message must be simple enough to be "Ripped" in the brief time between the "decision point" and the point where the bands are appended or overwritten. This works best with a simple text string or pattern image such as solid black, stripes, or a checkerboard pattern. In this example, the alternate image requires very little storage because it is not stored in bitmap form. Moreover, this method may be implemented quickly as the alternate image is appended to, instead of branched from the original image.

In another exemplary embodiment of the present disclosure a computer-readable storage medium is provided. The computer-readable storage medium includes instructions that when executed by a machine perform the methods described herein. Computer-readable storage media includes volatile and non-volatile, removable and non-removable media implemented in any method or technology for storage of information such as computer readable instructions, data structures, program modules, or other data, Memory, removable storage, and non-removable storage are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device.

It should be noted that the "bands" data structure described in this disclosure is just one example of how the bitmap data may be stored. More complex data structures can be used and manipulated in a conceptually similar fashion in accordance with this disclosure. For example, some printers store the bitmap in "tiles" of roughly 128×128 pixels, with a complex structure of pointers forming the tiles into a chain of bands. The present disclosure may still be applied to such a structure by considering a set of tiles to be a "band" and performing the appropriate operations to the linking pointer structure.

It should be understood that modifications can be made to the disclosure in light of the above detailed description. The terms used in the following claims should not be construed to limit the disclosure to the specific embodiments disclosed in the specification and the claims. Rather, the scope of the disclosure is to be determined entirely by the following claims, which are to be construed in accordance with established doctrines of claim interpretation.

What is claimed is:

1. A method of marking print media comprising:
preparing an image for printing on a sheet of print media, the image including an indication of a first and a second event;
printing, by a print engine of an image forming device, a first portion of the image on the sheet of print media at a first location in the image forming device at or near the print engine;
evaluating data associated with the sheet of print media and selecting, based upon the data evaluated, only one of a second portion of the image indicating an occurrence of the first event and the second portion of the image indicating an occurrence of the second event; and
printing, by the print engine, the selected second portion of the image on the sheet of print media at the first location in the image forming device,
wherein the first portion of the image comprises a first predetermined number of bands of the image and the second portion of the image comprises a second predetermined number of bands of the image, the bands being linked together in a linked list data structure, wherein the data structure containing a last band of the first portion of the image includes a first link to a first band of the second portion of the image corresponding to the occurrence of the first event and a second link to a first band of the second portion of the image corresponding to the occurrence of the second event, the first and second links forming a branch in the linked list data structure.

2. The method of claim 1, wherein the data is associated with an object on or within the print media.

3. The method of claim 2, wherein the object is an RFID device.

4. The method of claim 3, wherein the evaluating comprises determining whether the RFID device is defective or non-defective, the RFID device being defective corresponding to one of the first and second events and the RFID device being non-defective corresponding to the other of the first and second events.

5. The method according to claim 3, further comprising programming the RFID device.

6. The method of claim 1, further comprising wirelessly receiving the data.

7. The method according to claim 1, wherein printing the second portion of the image is printed after the first portion of the image.

8. The method according to claim 1, wherein preparing an image for printing occurs before the print media reaches an image point.

9. The method according to claim 1, wherein evaluating data includes determining if a defective or a non-defective RFID device is present.

10. The method according to claim 1, wherein the first event corresponds to a non-defective RFID object and the second event corresponds to a defective RFID object.

11. The method of claim 1, wherein the first portion of the image comprises a first predetermined number of bands of the image and the second portion of the image comprises a second predetermined number of bands of the image, the second portion of the image indicating the occurrence of the first event and the second portion of the image indicating the occurrence of the second event include a third predetermined number of bands having identical image data.

12. The method of claim 1, wherein each of the data structure for a band associated with the first link and the data structure for a band associated with the second link includes a link to a same band in the second portion of the image.

13. The method of claim 1, wherein the preparing comprises preparing a page description language description of the image, including sections for the first portion of the image, and only one of the second portion of the image indicating the occurrence of the first event and the second portion of the image indicating the occurrence of the second event.

14. The method of claim 13, wherein the section for the second portion of the image indicating the occurrence of the second event describes a watermark which overlays the second portion of the image indicating the occurrence of the first event.

15. The method of claim 13, wherein the section for the second image indicating the occurrence of the second event describes the image as a watermark or overlay relative to at least one of the section for the first image and the section for the second image indicating the occurrence of the second event.

16. A non-transitory computer-readable storage medium having stored thereon instructions that when executed by a machine result in the following as applied to print media:
preparing an image for printing on a sheet of print media, the image including an indication of a first and a second event;
printing, by a print engine of a printing device, a first portion of the image on the sheet of print media at a first print location in the printing device at or near the print engine;
evaluating data associated with the sheet of print media and electing, based upon the data evaluated, to print a second portion of the image indicating an occurrence of the first event or to print the second portion of the image indicating an occurrence of the second event, the evaluating performed during the printing the first portion of the image on the sheet of print media; and
printing, by the print engine, the elected second portion of the image on the sheet of print media at the first print location in the printing device.

17. The non-transitory computer-readable storage medium according to claim 16, wherein the data is associated with an object on or within the print media.

18. The non-transitory computer-readable storage medium according to claim 17, wherein the object is an RFID device.

19. The non-transitory computer-readable storage medium according to claim 18, wherein the first event corresponds to the RFID device being defective and the second event corresponds to the RFID device being non-defective.

20. The non-transitory computer-readable storage medium according to claim 18, further comprising programming the RFID device.

21. The non-transitory computer-readable storage medium according to claim 16, further comprising wirelessly receiving the data.

22. The non-transitory computer-readable storage medium according to claim 16, wherein printing the second portion of the image is performed after the first portion of the image is printed.

23. The non-transitory computer-readable storage medium according to claim 16, wherein preparing the image for printing occurs before the print media reaches an image point.

24. The non-transitory computer-readable storage medium of claim 16, wherein the first portion of the image comprises a first predetermined number of bands of the image and the second portion of the image comprises a second predetermined number of bands of the image, the bands being linked together in a linked list data structure, wherein the data structure containing a last band of the first portion of the image includes a first link to a first band of the second portion of the image corresponding to the occurrence of the first event and a second link to a first band of the second portion of the image corresponding to the occurrence of the second event, the first and second links forming a branch in the linked list data structure.

25. The non-transitory computer-readable storage medium of claim 16, wherein the first portion of the image comprises a first predetermined number of bands of the image and the second portion of the image comprises a second predetermined number of bands of the image, and the second portion of the image indicating the occurrence of the first event and the second portion of the image indicating the occurrence of the second event include a third predetermined number of bands having identical image data.

26. The non-transitory computer-readable storage medium according to claim 16, wherein the evaluating comprises electing, based upon the data evaluated, to print only one of a second portion of the image indicating an occurrence of the first event and the second portion of the image indicating an occurrence of the second event.

27. A system for marking media during a printing process comprising:
at least one processor configured to prepare an image for printing on a sheet of print media, the image including an indication of a first and a second event;
a printing device configured to print a first portion of the image on the sheet of print media at a first print location within the printing device; and
a radio frequency controller having control logic for performing a set of radio frequency control functions, the controller configured to evaluate data associated with an object on or within the sheet of print media during the printing the first portion of the image on the sheet of print media at the first print location within the printing device;
wherein the at least one processor selects a second portion of the image to be printed based upon the data evaluated, the second portion indicating only one of an occurrence of either the first event or the second event, and controls the printing device to print the second portion of the image on the sheet of print media selected at the first print location within the printing device.

28. The system of claim 27, wherein the printing device comprises an electrophotographic printer, an inkjet printer, a fax device, a copier, an all-in-one device or a multipurpose device.

29. The system of claim 27, wherein the object is an RFID tag.

30. The system of claim 29, wherein the radio frequency controller generates data indicating if the RFID tag is defective or non-defective, the first event corresponding to the RFID tag being defective and the second event corresponding to the RFID tag being non-defective.

31. The system of claim 27, wherein the data is wirelessly communicated.

32. The system of claim 27, wherein the printing device is configured to print the second portion of the image after the first portion of the image is printed.

33. The system of claim 27, wherein the at least one processor prepares an image for printing before the print media reaches an image point within the printing device.

34. The system of claim 27, wherein the radio frequency controller determines if a defective or non-defective RFID device is present.

35. The system of claim 27, wherein the first portion of the image comprises a first predetermined number of bands of the image and the second portion of the image comprises a second predetermined number of bands of the image, the bands being linked together in a linked list data structure, wherein the data structure containing a last band of the first portion of the image includes a first link to a first band of the second portion of the image corresponding to the occurrence of the first event and a second link to a first band of the second portion of the image corresponding to the occurrence of the second event, the first and second links forming a branch in the linked list data structure.

* * * * *